United States Patent [19]

Johnson, Jr.

[11] Patent Number: 4,492,990
[45] Date of Patent: Jan. 8, 1985

[54] NOISE REDUCTION SYSTEM

[75] Inventor: Clark E. Johnson, Jr., Minneapolis, Minn.

[73] Assignee: Vertimag Systems Corporation, Minneapolis, Minn.

[21] Appl. No.: 470,435

[22] Filed: Feb. 28, 1983

[51] Int. Cl.³ ............................ G11B 5/00; G11B 5/09
[52] U.S. Cl. ......................................... 360/32; 360/51
[58] Field of Search ............................. 360/32, 51, 45

[56] References Cited

U.S. PATENT DOCUMENTS 4,451,858 5/1984 Johnson, Jr. ........................ 360/32

Primary Examiner—Vincent P. Canney
Attorney, Agent, or Firm—Jacobs & Jacobs

[57] ABSTRACT

A system for recording audio and video signals on magnetic and other media including a generator of a time-reference square-wave signal, a circuit for combining the dc level with an input audio or video signal, and a sampling circuit wherein the sum of the input signal and the dc level are sampled in synchronism with the square-wave signal. The time-reference signal and a second signal, delayed therefrom, are then recorded by saturation of the magnetic medium in both positive and negative directions. The amount of delay between the two recorded signals is proportional to the amplitudes of the successive samples of the sampling circuit. After playback, the original input signal is retrieved from the recorded signals by comparing successive samples with a succession of ramp waveforms and filtering out the sampling spectrum and the dc level.

19 Claims, 6 Drawing Figures

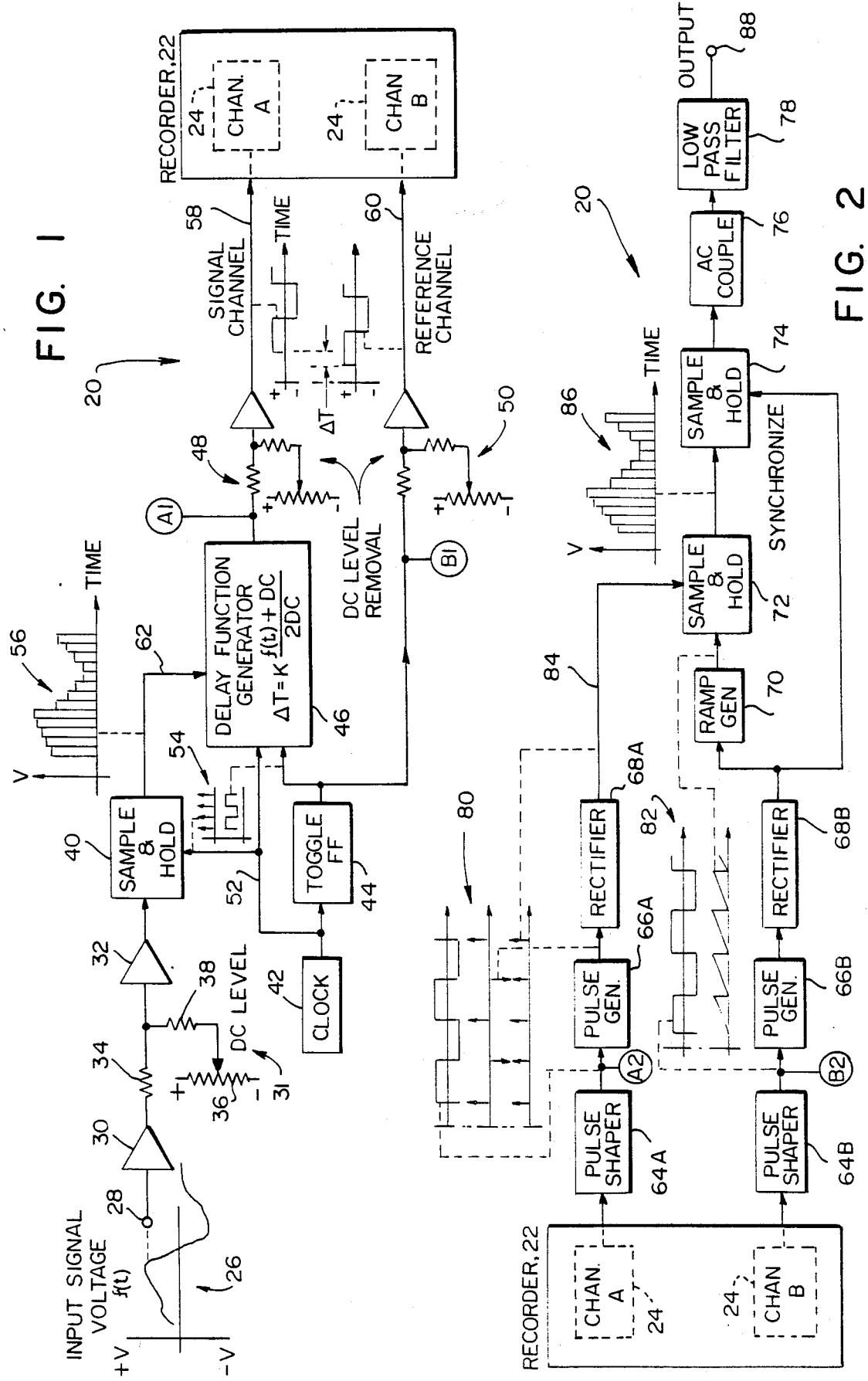

NOISE REDUCTION SYSTEM

This invention relates to digital recording equipment and, more particularly, to the use of paired signals impressed in the recording medium wherein the time delay between the signals corresponds to the amplitude of an input signal which is to be recorded.

Both digital and analog recorders have been utilized in the recording of high-fidelity sound and high quality video. Digital recording is preferred in that it provides improved dynamic range and better equalization than that of analog recorders. A further advantage is found in the virtual elimination of noise. Thus, digital recording of music, or video, eliminates all of the noise contribution of the recording media itself (normally −50 dB). In analog recording systems, such as those utilizing magnetic tape as the recording medium, the tape noise is generally the largest contributor to the total amount of noise introduced by the recording and reproduction processes. The tape noise for audio recording is most troublesome in the 3–7 kHz (kilohertz) range wherein the ear is most sensitive. Thus, the elimination of tape noise is a most useful feature of digital audio recording.

However, a problem is present with the use of digital recording techniques in that the digital recorders have excessive complexity and cost which generally restrict their use to broadcast operation and other professional use. One way of avoiding this problem in the reduction of noise in high-fidelity recordings is the use of alternative techniques which are employed today in commercially available equipment. These techniques rely on the division of the audio spectrum into a number of contiguous bands which are to be turned off when there is no signal present in the corresponding spectral regions. Also, in the middle spectral bands wherein the ear is most sensitive to noise, a low-level passage is provided with increased gain during recording, the gain being reduced during playback. The resulting compression and expansion optimizes the signal-to-noise ratio of the signal channel.

In the digital recording of audio signals, one common technique provides for the sampling of an input signal at approximately 45,000 samples per second, followed by the digitizing of the respective samples into 16-bit digital signals (1 sign bit plus 15 amplitude bits). The resulting digital signal has a bit rate of 700,000 bits per second. The bits are then recorded on the magnetic media. Since the digital recording is accomplished by saturation of the magnetic media, the tape noise is eliminated. However, neither of the foregoing techniques provide an adequately simplified digital system for the reduction of noise.

The foregoing problem is overcome and other advantages are provided by a digital recording system incorporating the invention. The invention provides for the digital recording of audio and video signals to provide high-fidelity with reduced complexity of electronic equipment, and also a reduced cost. The invention is particularly adapted for the recording of analog signals by digital techniques on magnetic media such as tape, discs, and other such media. Reduction of media noise is obtained by virtue of the saturation, both positive and negative saturation of digitally formatted signals in the recording medium. In particular, the invention provides that the amplitude of a sampled analog signal is replaced by a time-dependent signal which is digitally formatted.

The invention is most readily demonstrated for the case of an analog signal such as an audio signal with a spectrum extending out to an assumed maximum frequency of 20 kHz. An electrical voltage representing such a signal has, typically, both positive and negative excursions. The circuitry of the invention provides for offsetting the analog signal by a dc level of sufficient magnitude to insure the resultant signal has only positive excursions; the resultant signal does not return to zero value. The resultant signal is then sampled at a rate above the Nyquist rate, the intersample period being less than one-half the reciprocal of the maximum frequency. Accordingly, samples are taken at an exemplary sample rate of 50 kHz, with the intersample interval being 20 microseconds.

In accordance with a feature of the invention, the amplitude data obtained in the respective samples is converted to time delay data between paired signals. In one embodiment of the invention, the paired signals are two separate square-wave signals to be recorded on separate channels of the magnetic recording medium, such as an exemplary tape recorder. In a second embodiment of the invention, the paired signals are the leading and trailing edges of a pulse of a square-wave signal, which signal is recorded on a single channel of the tape recorder. In both embodiments of the invention, the square-wave signals have both positive and negative excursions of current and voltage to provide for the switching of the magnetic domains in the recording medium to saturation in both the positive and negative directions. A delay circuit, operative in response to the amplitude of the signal samples plus the dc level, imparts the requisite delay between the paired signals in correspondence with the amplitude of the signal samples plus the dc level.

In conventional magnetic recording media, data are recorded by magnetizing the magnetic layer of the medium in a longitudinal direction parallel to the direction of relative movement between the magnetic medium and the transducer, or head, positioned adjacent to the medium. In perpendicular recording, data are recorded by magnetizing the magnetic recording layer in the direction perpendicular to the surface of the medium. In the present invention, it is preferred to record the signals on a perpendicular recording medium using perpendicular recording techniques. Suitable perpendicular recording media and techniques are described in Iwasaki et al. U.S. Pat. Nos. 4,210,946 and 4,251,842.

A further feature of the invention is the implementation of the delay circuit to separately delay the leading and trailing edges of each pulse of a square-wave signal such that both the leading and the trailing edges contain separate information about the amplitude of the input signal. This is distinguishable from pulse-position modulation wherein both the leading and trailing edges of a pulse are equally delayed. The independent delaying of the leading and trailing edges, in accordance with the invention, is advantageous in reducing the necessary bandwidth of the recording system for the recording of data of the amplitude of the input signal. The recording is preferably performed on perpendicularly oriented magnetic media to avoid a phenomenon known as "peak shift" which may result in a slight shifting in time of the recorded signals. Such a time shift would be reflected as an amplitude distortion in the recording technique of the invention, and, accordingly, the perpendicularly magnetic media is preferred.

By virtue of the foregoing transformaton of the amplitude of the input signal to corresponding delay between paired square-wave signals, and with the delay imparted to leading and trailing edges being accomplished independently, advantage is taken of recording in magnetic media by saturation in both positive and negative directions. Thereby, the tape noise associated with the recording of analog signals directly on magnetic tape is avoided.

The aforementioned aspects and other features of the invention are explained in the following description taken in connection with the accompanying drawings wherein:

FIG. 1 is a block diagram of the recording portion of the system of the invention;

FIG. 2 is a block diagram of the playback portion of the invention;

Figure 3:
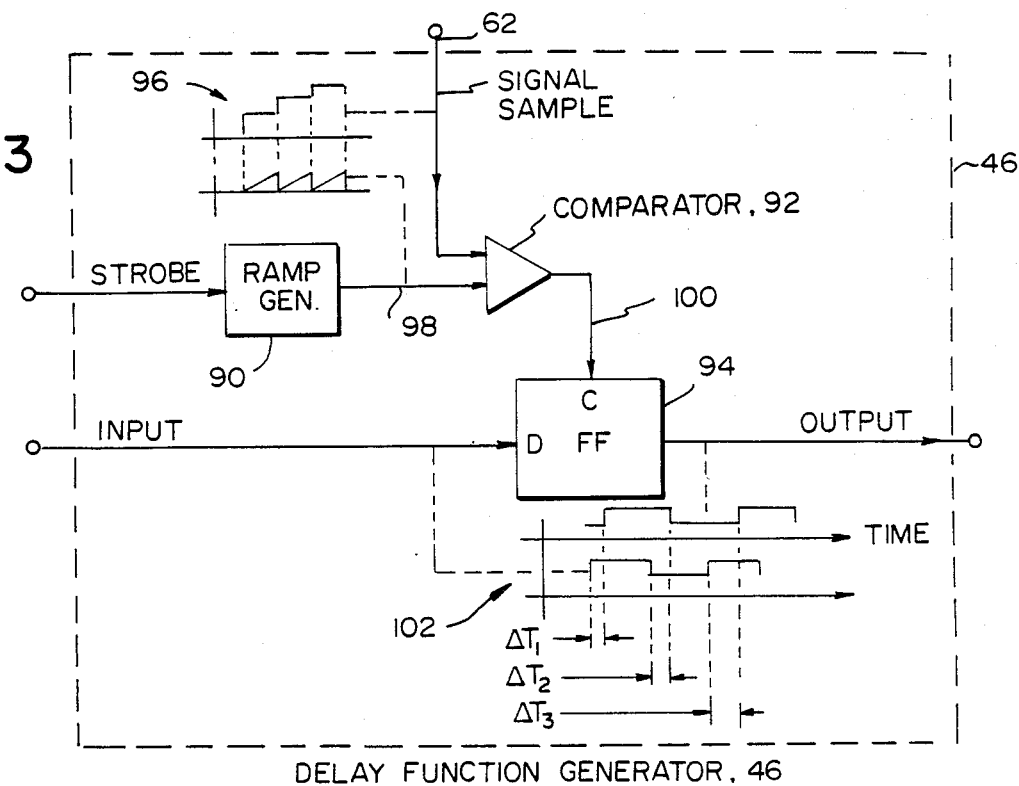
FIG. 3 is a block diagram of a function generator which imparts delay to the recording apparatus of FIG. 1.

The recording portion of a system 20, as shown in FIG. 1, includes a tape recorder 22 having two channels 24 designated A and B for the recording of an input analog signal portrayed by a graph 26 adjacent an input terminal 28 of the system 20. The voltage of the input signal is seen to have both positive and negative excursions. In accordance with the invention, the input signal is to be sampled, and the samples are to be utilized in developing a time-delay function between the signals of channel A and channel B in preparation for their recording by the recorder 22.

Prior to the sampling of the input signal, the signal is to be shifted positively relative to the horizontal axis of the graph 26 so that no point of the signal ever drops below zero volts. This is accomplished by combining a dc (direct current) level with the input signal as follows. The input terminal 28 connects with a preamplifier 30 to amplify the signal prior to the combination with the dc level. The preamplifier 30 is coupled to a level adjusting circuit 31 comprising a summing amplifier 32 and a summing resistor 34. The dc level is obtained by means of a potentiometer 36 connected between a positive supply voltage and a negative supply voltage, the central terminal of the potentiometer 36 being adjusted to secure the desired dc level. The potentiometer 36 is coupled via a summing resistor 38 to the amplifier 32 for combination of the dc level with the input signal so as to raise the waveform of the graph 26 above the horizontal axis.

The system 20 further comprises a sample-and-hold unit 40, a clock 42, a flip-flop 44, a function generator 46, and level-adjust circuits 48 and 50. The clock 42 provides a sequence of clock pulses on line 52 which serve as sampling time 52 as depicted in the upper trace of a graph 54. The clock pulses on line 52 toggle the flip-flop 44 to provide a square-wave signal, as depicted in the lower trace of the graph 54, having half the repitition frequency of the clock pulses on line 52. The clock pulses on line 52 also trigger the sample-and-hold unit 40 to sample output signals of the amplifier 32 and to hold each sample until the next sample is provided as depicted in a graph 56 adjacent the unit 40.

The output square-wave signal of the flip-flop 44 is applied to both channels 24 of the recorder 22, the square-wave signal for channel A being applied via the function generator 46 and the level-adjust circuit 48, the square-wave signal for channel B being applied via the level-adjust circuit 50. Each of the level-adjust circuits 48 and 50 comprise an amplifier such as the amplifier 32, a pair of resistors such as that the resistors 34 and 38, and a potentiometer such as the potentiometer 36 is described previously for the level-adjust circuit 31. The circuits 48 and 50 function in the manner analogous to that of circuit 31 to remove the dc level imparted by the circuit 31. Thus, the digitally formatted signal of the flip-flop 44 appears as a square-wave signal having equal positive and negative excursions on the lines 58 and 60.

In accordance with the invention, the signal on line 58 differs from that on line 60 in that the signal on line 58 has been delayed relative to the signal on line 60. The delay is imparted by the function generator 46 in response to a signal on line 62 from the output terminal of the sample-and-hold unit 40, the signal on line 62 serving as a modulating signal for modulating the delay between the signals on line 58 and 60 in accordance with the amplitude of the samples as depicted in the graph 56.

The delay introduced by the generator 46 varies linearly with the amplitude of the signal samples of the unit 40. A formula for providing such linear relationship is shown within the block of the unit 46 wherein a numerator of the fraction is the amplitude of a sample, the denominator is a normalizing factor, and the constant K provides for a maximum value of delay which is less than one-half period of the square-wave on line 60. Thereby, the signals on the lines 58 and 60 are seen to be identical, but differing in their temporal relationship. In particular, the corresponding leading edges and the corresponding trailing edges of the signal on the lines 58 and 60 are delayed independently of each other, each of these edges being delayed by succeeding ones of the samples of the unit 40. Further details on the construction and operation of the function generator 46 will be presented with reference to FIG. 3.

The remaining portion of the system 20 provides the playback function as depicted in FIG. 2. The playback portion comprises pulse shapers 64A-B, pulse generators 66A-B, rectifiers 68A-B, a ramp generator 70, a sample-and-hold unit 72, a sample-and-hold unit 74, an ac (alternating current) coupling circuit 76, and a low-pass filter 78. The shapers 64A-B are identical circuits which function in a well-known manner to restore the square-wave shape to the pulse signals stored in the channels 24 of the recorder 22. As is well known, the storage in magnetic media, or other such media, may introduce some distortion to the signal stored on the recording medium. Use of the shapers 64A-B insures that the signals at their respective output terminals will be the same as signals on the lines 58 and 60 of FIG. 1. An examplary waveform of the output signal of the shaper 64A is shown in the top trace of a graph 80 adjacent the block of the shaper 64A.

The pulse generator 66A acts as a differentiator to provide pulse signals at the leading and trailing edges of the output signal of the shaper 66A as shown in the second trace of the graph 80. The rectifier 68A converts the negative pulses of the generator 66A to positive pulses so that all of the pulses are positive pulses as depicted in the third trace of the graph 80. The generator 66B and the rectifier 68B function in the same manner as do the generator 66A and the rectifier 68A.

The ramp generator 70 provides a sequence of ramp signals. each ramp being initiated by a pulse from the rectifier 68B as depicted in the second trace of a graph 82. The output signal of the shaper 64B is depicted in the first trace of the graph 82, the first and second traces of the graph 82 being in temporal registration with each other. The output signal of the ramp generator 70 is sampled by the sample-and-hold unit 72 in response to a strobing of the unit 72 by a pulse on line 84 from the rectifier 68A. The resulting sampling by the unit 72 produces a sequence of samples as depicted in a graph 86 located adjacent the unit 72. As has been described previously, the square-wave signal of channel A in the recorder 22 has been delayed relative to the square-wave of channel B. The amount of delay is proportional to the amplitude of the samples shown in the graph 56 in the recording portion of the system 20. Accordingly, the same variation in delay appears in the strobing signals on line 84 with the result that, at times, a ramp signal of the graph 82 is sampled in the beginning of the ramp wherein the voltage is relatively low and, at times, the ramp is sampled near the end of the ramp when the voltage thereof is relatively large. Accordingly, the resultant set of samples, as depicted in the graph 86, is the same as the set of samples depicted in the graph 56.

It is also noted that the leading edges of each of the samples of graph 86 coincide with the instant of sampling by the strobe signals on line 84. Thus, the positions of the samples 86 tend to drift back and forth along the time axis of the graph 86 in accordance with the amplitude of the sample. However, with respect to the samples of the graph 56, the samples are stationery in time, being independent of the amplitude of the input signal. Accordingly, in order to remove the drifting of the samples of the unit 72 along the time axis in the graph 86, which drifting is less than one-half period of the square-waveform of channel B, the sequence of samples of the unit 72 are resampled by the sample-and-hold unit 74 so as to synchronize the temporal locations of the samples of the graph 86 with those of the graph 56. Accordingly, the output signals of the unit 74 have the same amplitudes as the corresponding signals of the unit 40, and also are synchronized with the signals of the unit 40.

The output signal of the unit 74 has been coupled by the coupling circuit 76 to the filter 78. The coupling circuit 76, as is well known, comprises a capacitor for blocking the dc level in the sequence of samples at the output terminal of the unit 74. The low-pass filter 78 then removes the high frequency components associated with the sampling process, these frequency components being above the audio spectrum of the input signal depicted in the graph 26, with the result that the output signal of the filter 78 appearing at terminal 88 is a duplicate of the input signal at the terminal 28.

FIG. 3 shows circuitry of the function generator 46 of FIG. 1. The generator 46 comprises a ramp generator 90, comparator 92, and a flip-flop 94. Signal samples arrive along line 62, exemplary samples being shown in the upper trace of a graph 96. The ramp generator 90 provides a succession of ramp signals as depicted in the lower trace of the graph 96, each ramp signal being initiated in response to a strobing by pulses on the line 52. As will be recalled with reference to the explanation of the operation of the sample-and-hold unit 40 of FIG. 1, the output series of samples is in synchronism with clock pulse signals on line 52. Correspondingly, the ramp waveforms and the sample waveforms in the graph 96 are in temporal registration with each other. The output signals of the ramp generator, on line 98, are compared by the comparator 92 with the signal samples on line 62. As the ramp signal on line 98 increases with time, the amplitude of the ramp signal eventually reaches the amplitude of the signal sample on line 62. At the point where equality is attained, this being a sampling time, the comparator 92 provides a logic 1 signal on line 100 which clocks the flip-flop 94.

The flip-flop 94 is a type-D flip-flop wherein the signal on the input terminal D is transferred to the output terminal. Upon receipt of a strobe or clock signal at terminal C. The logic 1 signal on line 100 serves as such a strobe signal. Thus, the logic level of the signal at the output terminal of the flip-flop 44 (FIG. 1) appears at the output terminal of the generator 46 when an equality is obtained between the amplitude of the ramp signal on line 98 and a sample on line 62. The signal at the output terminal of the generator 46 is retained until the next clocking of the flip-flop 94 by the signal on line 100 from the comparator 92. As a result, the leading and trailing edges of the squarewave signal at the output terminal of the generator 46 are delayed relative to the corresponding edges of the signal of the flip-flop 44 by an amount of delay proportional to the amplitude of the samples on line 62.

As has been noted above, the samples on line 62 include both the amplitude of the input signal of terminal 28 (FIG. 1) plus the dc level inserted at the summing amplifier 32. Thus, the operation of the generator 46 follows that of the formula shown in FIG. 1. The delays between the leading and trailing edges of the output and input signals of the generator 46 are shown in the graph 102 wherein the upper trace represents the output signal while the lower trace represents the input signal of the generator 46. In particular, it is noted that the delay imparted to the leading edge of a pulse may differ from the delay imparted to the trailing edge of a pulse in the event that succeeding samples on line 62 differ in amplitude. The slope of the ramps in the ramp signals of the generator 90 is adjusted so that the maximum delay imparted between any pair of edges of the pulses in the graph 102 is less than one-half the period of the waveform in the lower trace of the graph 102.

Figure 4:
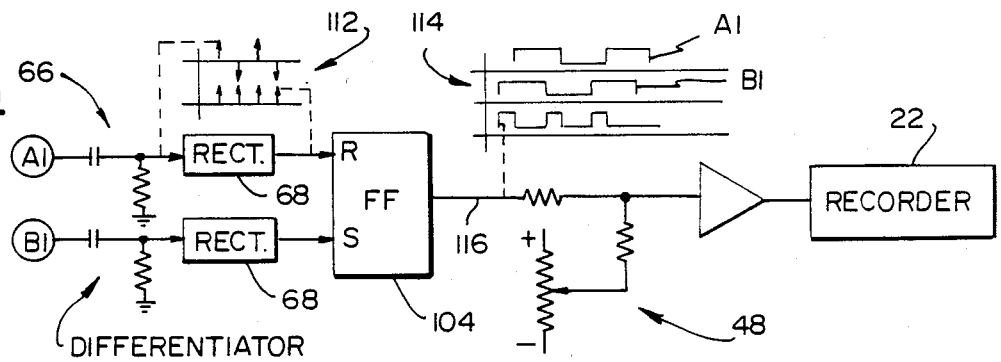
FIGS. 4 and 5 are block diagrams of a further embodiment of a portion of the circuits of FIGS. 1 and 2 respectively.
Figure 5:
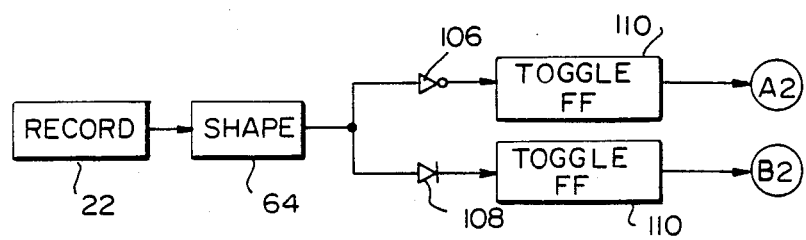

FIGS. 4 and 5 show modifications which may be made to a system 20 of FIGS. 1 and 2 so as to permit the digital recording of the audio signal on a single channel of the recorder 22. The circuit of FIG. 4 comprises two pulse generators 66, two rectifiers 68, a level-adjust circuit 48, and the recorder 22, all of which were seen previously in FIGS. 1 and 2. The pulser 66, in FIG. 4, is represented by a capacitor-resistor circuit which functions as a differentiator, the operation and function of the generator 66 being the same as that of the generators 66A-B of FIG. 2. Similarly, the operation and function of the rectifiers 68 of FIG. 4 is the same as that of the rectifiers 68A-B of FIG. 2. Also, the operation and function of the level-adjust circuit 48 in FIG. 4 is the same as that described previously with reference to FIG. 1. Also included in the circuit of FIG. 4 is a flip-flop 104 which is constructed in the form of a set-reset flip-flop. The circuit of FIG. 4 is connected between the terminals A1 and B1 in FIG. 1, and replaces the connection shown therein to the recorder 22 for the recording of the audio signal.

Similarly, the circuitry of FIG. 5 is connected between the terminals A2 and B2 of FIG. 2, and replaces the connection therein to a recorder 22 for playback of the audio signal. The circuit of FIG. 5 includes a pulse shaper 64 and a recorder 22 as shown in FIG. 2, the pulse shaper 64 functioning in the same manner as the shaper 64A of FIG. 2. Also included in the circuit of FIG. 5 is a digital inverter 106, a diode 108, and two flip-flops 110. The output waveform of the shapers 64 of FIG. 5 is a squarewave having both positive and negative excursions, as do the waveforms on the lines 58 and 60 of FIG. 1, the positive excursions being coupled via the diode 108 for strobing the flip-flop 110 coupled thereto, while the negative excursions are coupled via the inverter 106 for strobing the flip-flop 110 coupled thereto. Both of the flip-flops 110 are of the toggle form, and, accordingly, upon being strobed, each flip-flop 110 alters the state of its output signal.

In operation, the circuits of FIGS. 4 and 5 provide for the recording and playback of the audio signal utilizing only one channel of the recorder 22 as follows. In FIG. 4, the signals of the pulse generators 66 and rectifiers 68 are depicted in the upper and lower traces of a graph 112. The output pulses of the two rectifiers 68 alternately set and reset the flip-flop 104, the setting being done by an edge of the square-wave signal at terminal B1 while the resetting is being done by the corresponding delayed edge of the signal at terminal A1. The setting and resetting thus provide the necessary sampling times. A waveform of the signals at terminal A1, terminal B1, and the output terminal of the flip-flop 104 are shown respectively in the first, second and third tracings of the graph 114. Therein, it is seen that the signal at the output terminal of the flip-flop 104 on line 116 is a pulse-width modulated signal wherein the leading edge is synchronized with an edge of the signal at terminal B1 while the trailing edge of the signal on line 116 is synchronized with an edge of the signal at terminal A1. It is noted that a pulse of the signal on line 116 occurs with each edge of the signal at terminal B1 and, accordingly occurs at twice the repetition frequency of the signal at terminal B1. The signal on line 116 is then applied via the level-adjust circuit 48 to a channel of the recorder 22 to be recorded. The circuit 48 functions as has been described previously with reference to FIG. 1 so as to remove the dc level of the signal on line 116 prior to the recording process.

In the circuit of FIG. 5, the single-channel pulse-width modulated signal is converted back into two squarewave signals so that the remaining portion of the playback section of the system 20 (FIG. 2) can operate in the manner previously described. The pulse shaper 64 corrects the waveform of the recorded pulse train so as to compensate for any distortion introduced by the recording process. Thereupon, the leading and trailing edges of the square-wave signal of the shaper 64 alternately toggle the two flip-flops 110 to produce squarewave signals at the terminals A2 and B2 having the same form as the signals portrayed in the first and second traces of the graph 114, these being the signals at the terminals A1 and B1. Thereby, the circuitry of FIGS. 4 and 5 have provided a modification to the circuitry of the system 20 to permit the digital recording of the audio signal on only one channel of the recorder 22. It is to be noted, however, that the same tape speed can be used for both recordings, since it is the fidelity of the recording process in maintaining the temporal locations of the edges of the recorded waveforms which govern the accuracy of the recording.

Figure 6:
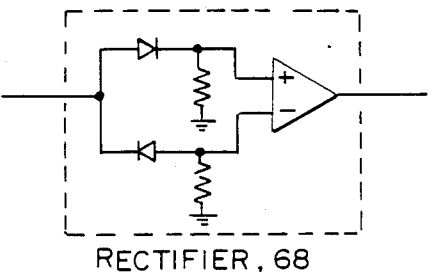
FIG. 6 is a schematic drawing of a rectifier of FIG. 4.

FIG. 6 shows an exemplary circuit for the rectifiers 68 of FIG. 4, as well as the rectifier 68A and B of FIG. 2. The input terminal of the rectifier 68 is coupled to a pair of oppositely poled diodes which connect with the positive and negative terminals of an operational amplifier or comparator. Thereby, an output pulse of positive sense is produced for an incoming positive pulse as well as for an incoming negative pulse. Thus, the train of oppositely poled pulses in the second trace of the graph 80 (FIG. 2) is converted to the sequence of unidirectional pulses in the third trace of the graph 80.

In order to preserve the time delays of the recording signals, it is preferred that the magnetic medium utilized in the recording process be a perpendicularly oriented magnetic medium. The perpendicular magnetic medium is preferred because of a phenomenon referred to as "peak shift" which occurs with high-density conventional longitudinal magnetic media. Such peak shift results in a change in the spacing between phase reversals in the recorded signal and, hence, a time shift in the recorded signal. Such a time shift is reflected as an amplitude distortion in the foregoing recording process. Such distortion is reduced to a mathematically predictable and thus correctable level by use of the perpendicularly oriented magnetic medium.

With respect to the quality of the signal obtained during the playback process, it is noted that noise can be produced by slight time displacements of the pulse trains (in the two-channel embodiment), and by displacements of the successive edges of the square-wave signal in the single channel embodiment. A noise level −60 dB corresponds to an error of 0.1% in the timing. Thus, with respect to the foregoing example of a 20 kHz audio signal and a 50 kHz sampling rate, an error of 20 nanoseconds corresponds to the −60 dB noise level.

Since the time base signal is included within the recording, the recording process permits the use of mechanical tape speed correction during playback by means of a well-known phase-lock loop motor control, or other form of electronic jitter correction.

With reference to the foregoing example of the 20 kHz audio signal and the 50 kHz sampling rate, recording on magnetic tape capable of 25,000 flux changes per inch would require a minimum tape speed of approximately 2 inches per second. Such a tape speed is utilized today in commercially available recording equipment. For stereo, an additional data track is required for the second channel. The timing channel, channel B of FIGS. 1 and 2, can be used for both stereo data tracks.

A further advantage of the foregoing recording process, when using the separate clock track of FIGS. 1 and 2, arises from the relative insenitivity of the system 20 to misalignment of playback heads. In current digital audio systems, a great expense occurs in the alignment of the multiple-track heads. However, with the invention a slight track misalignment results in a change in the dc component of the output signal from the sample-and-hold unit 74 of FIG. 2; however, this dc component is removed by the ac coupling circuit 76 so as to remove the effect of the misalignment. Of course, in the alternative embodiment of FIGS. 4 and 5, no misalignment occurs since only one recording head need be used for the one channel. The recording parameters for the alternative embodiment of FIGS. 4 and 5 are selected so as to produce a pulse-width modulation in the range of, typically, 0.25-0.75 of the interval between the clock pulses applied to each input terminal of the flip-flop 104 of FIG. 4.

It is to be understood that the above-described embodiments of the invention are illustrative only and that modifications thereof may occur to those skilled in the art. Accordingly, this invention is not to be regarded as limited to the embodiments disclosed herein, but is to be limited only as defined by the appended claims.

What is claimed:

1. A recording system comprising:
   means for generating a square-wave signal;
   sampling means synchronized to said generating means for providing samples of an input signal;
   delay means coupled to said generating means and driven by said samples of said sampling means for delaying, independently, the leading and the trailing edges of successive pulse of said square-wave signal to provide a delayed signal, the amount of delay in said delayed signal being dependent on amplitudes of said samples;
   means for recording said square-wave signal and said delayed signal in synchronism with each other, said square-wave signal serving as a time-reference signal during playback; and
   playback means coupled to said recording means for retrieving said input signal.

2. A system according to claim 1, wherein said sampling means includes means for offsetting a dc level of said input signal prior to the sampling of said input signal by said sampling means.

3. A system according to claim 2, wherein the delay introduced by said delay means is proportional to the sum of the amplitudes of said input signal plus said dc level.

4. A system according to claim 3, wherein said delay is less than one-half period of said square wave.

5. A system according to claim 1, wherein said recording means is a perpendicular recording means comprising a magnetic recording medium and a transducer means for recording signals on said medium perpendicular to the surface thereof.

6. A system according to claim 1, wherein said recording means records said square-wave signal and said delayed signal in separate channels.

7. A system according to claim 1, wherein said recording means includes means for combining said square-wave signal and said delayed signal into a composite signal, said composite signal being recorded in a single channel.

8. A system according to claim 7, wherein said playback means includes means for extracting said time-reference signal and said delayed signal from said composite signal.

9. A system according to claim 8, wherein said playback means includes a ramp-generating means driven by said time-reference signal for providing a ramp waveform during each one-half period of said time-reference signal, and regeneration means driven by said delayed signal for sampling said ramp waveform to regain the amplitude of said samples.

10. A system according to claim 9, wherein said sampling means includes means for introducing a dc level to said input signal prior to a sampling thereof by said sampling means, said system further including filtering means coupled to said playback means for removing said dc level to regain the waveform of said input signal from a sequence of samples from said regeneration means.

11. A system according to claim 5, wherein said recording means includes means for combining said square-wave signal and said delayed signal into a composite signal, said composite signal being recorded in a single channel.

12. A system according to claim 11, wherein said playback means includes means for extracting said time-reference signal and said delayed signal from said composite signal.

13. A system according to claim 12, wherein said playback means includes a ramp-generating means driven by said time-reference signal for providing a ramp waveform during each one-half period of said time-reference signal, and regeneration means driven by said delayed signal for sampling said ramp waveform to regain the amplitude of said samples.

14. A system according to claim 13, wherein said sampling means includes means for introducing a dc level to said input prior to a sampling thereof by said sampling means, said system further including filtering means coupled to said playback means for removing said dc level to regain the waveform of said input signal from a sequence of samples from said regeneration means.

15. A system according to claim 6, wherein said playback means comprises ramp-generation means driven by said time-reference signal for providing a ramp waveform during each one-half period of said time-reference signal, and wherein said playback means further comprises regeneration means driven by said delayed signal for sampling said ramp waveform to regain the amplitude of the samples.

16. A system according to claim 15, wherein said sampling means includes means for introducing a dc level to said input signal prior to a sampling thereof by said sampling means, said system further comprising filtering means couplied to said playback means to remove said dc level for retrieving the waveform of said input signal from a sequence of samples provided by said regeneration means.

17. A method of recording comprising the steps of:
    generating a square-wave signal;
    sampling an input signal to provide samples thereof in synchronism with said square-wave signal;
    independently delaying leading and trailing edges of said square-wave signal in accordance with the amplitude of said samples of said input signal to provide a delayed signal;
    recording said square-wave signal and said delayed signal in synchronism with each other, said square-wave signal serving as a time reference signal during a playing back of recorded signals; and
    playing back said delayed signal and said time-reference signal, said playing back including the step of retrieving said input signal from said delayed signal and said time-reference signal.

18. A method according to claim 17, wherein said step of recording includes a step of combining said delayed signal and said square-wave signal to produce a composite signal to be recorded; and wherein said step of playing back includes the step of extracting said time-reference signal and said delayed signal from said composite signal.

19. A method according to claim 17, wherein said step of recording is accomplished by perpendicular recording on magnetic media.

* * * * *